United States Patent Office 3,347,561
Patented Oct. 17, 1967

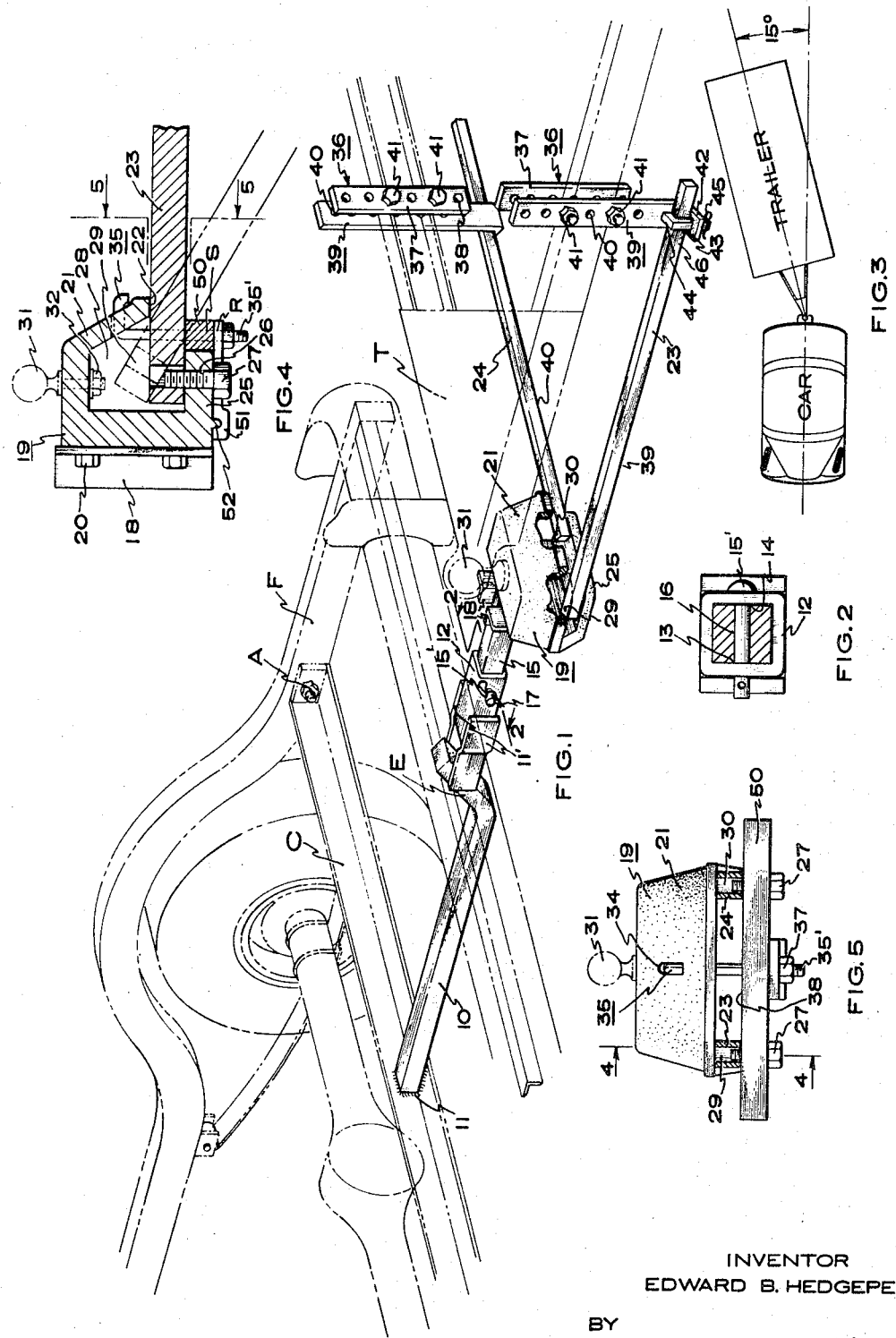

3,347,561
TRAILER HITCH STRUCTURE
Edward B. Hedgepeth, 1132 East 27th South,
Salt Lake City, Utah 84108
Filed Jan. 24, 1966, Ser. No. 522,708
2 Claims. (Cl. 280—406)

ABSTRACT OF THE DISCLOSURE

This invention provides trailer hitch structure of a type shown in the inventor's patent, U.S. Patent No. 3,021,154, but with the inclusion of means for constraining the movement of the lifting arm members to movements which are in correspondence with the frame of the trailer being towed. This avoids side-sway and other objectionable features as hereinafter set forth. The invention also comprehends the inclusion of a novel bar, disposed in the head structure of the hitch, which bar is adjustably secured to the head and frictionally engages the lift arm members for the purposes hereinafter enumerated.

---

The present invention relates to trailer hitches for vehicles such as automobiles and, more particularly, to a new and improved trailer hitch, whether of frame or axle type, which will reduce trailer sidesway to a minimum during transit.

There are a number of different types of trailer hitches on the market at the present time. See, for example, the inventor's United States Patent No. 3,021,154. It has been found through extensive experimentation by the inventor that current hitch design can be improved to prevent sidesway of trailers when in transit. A common experience of most drivers of vehicles such as automobiles is that when they are towing a trailer, considerable vibration, sidesway, and other deleterious effects are present when the vehicle-trailer combination is passed by another vehicle such as a large truck going in the opposite direction. The reason for this is that the oncoming vehicle generates large gusts of air which tend to force the vehicle and trailer from the highway. Then, immediately upon commencing to pass the vehicle, the Bernoulli theorem and Venturi effect of the physical sciences come into play. This is to say, there is a reduced pressure area generated between the two passing vehicles so that the partial vacuum so formed tends to draw the vehicles together. This effect may be so pronounced that the sidesway of the trailer may well prove to be uncontrollable. Indeed, there have been many instances of trailers tipping over on the highway, this due to gusts of wind and reduced pressure areas either naturally or artificially produced.

Accordingly, a principal object of the present invention is to provide a new and improved hitch design for trailers wherein such hitch design will dampen sidesway tendency and tend to render vehicle-trailer combinations stable and reliable in the face of atmospheric turbulence.

A further object of the invention is to provide a trailer hitch for vehicles, to enable the same to haul trailers, and wherein the hitch relies upon naturally-produced forces of friction of appropriate direction to dampen trailer sidesway and vibration.

A further object is to provide a trailer hitch wherein adjustable frictional forces are generated to deter or dampen any sidesway tendencies of the trailer relative to its towing vehicle.

A further object is to provide in a trailer hitch head a unique friction bar structure which will further serve to amplify the desired frictional effects of the hitch in reducing sidesway tendencies of the construction.

An additional object is to provide a friction-force-producing head in a trailer hitch construction, by which and through simple adjustment the frictional forces imparted to the head will tend to deter rapid, undesired movements of the trailer relative to the towing vehicle.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a perspective view of a trailer hitch incorporating the features of the present invention; in FIGURE 1 the towing vehicle and trailer frame are shown in phantom lines for convenience of illustration.

FIGURE 2 is a vertical section taken along the line 2—2 in FIGURE 1, showing the attachment of the stub bar of the hitch to its receptacle.

FIGURE 3 is a schematic plan of a vehicle such as a car towing a trailer, indicating one type of angular displacement of the trailer relative to the direction of travel of the car.

FIGURE 4 is a section taken along the line 4—4 in FIGURE 5; for convenience of illustration, the initial insertion of a representative lift arm of the structure is shown in phantom line condition.

FIGURE 5 is a rear elevation of a modified head of the structure wherein, as is also the case in FIGURE 4, a friction bar and supporting structure is added to the hitch to enable further production of frictional forces and their selective adjustment within the hitch structure.

The various parts, as shown in the drawings, are metal, preferably steel; "friction contact," "friction surfaces," and so forth, refers to that friction which obtains through metal-to-metal contact between adjacent parts, whatever the surface roughness and pressure of contact between these parts.

In FIGURE 1 frame F is provided with a self-contained or added cross-member C which is bolted to the frame by means of cross-member attachments A. Drawbar 10 is welded or otherwise secured at 11 to the cross-member C and, at its rearward extremity, is provided with a clevis connection 11'. The upturned end E (disposed forwardly and underneath the rear bumper) of the drawbar 10 may be provided to accommodate relief of any, otherwise-interfering structure of the undercarriage of the automobile which may be present. The clevis connection 11' may be welded to drawbar 10 and also to a receptacle 12. Receptacle 12 is provided with aligned apertures 13 and 14 which receive pin 15'. Aperture 16 of stub bar 15 is provided for the pin 15' as well. Stub bar 15 is inserted into the receptacle 12 as shown, and cotter or other retainer 17 completes the securement of this portion of the structure. Stub bar 15 may be welded to attachment brackets 18, both of which receive, immediately therebetween, the stub bar 15. Brackets 18 are bolted to head 19 by means of bolts 20. Head 19 includes a depending skirt 21 providing a friction surface 22. The friction surface or lip 22 engages, in the manner of a fulcrum, the respective lift arms 23 and 24 which will be described hereinafter.

In returning to a consideration of head 19 it will be seen that the same includes a lower, horizontal, indented flange 25, the same being provided with drilled and tapped apertures 26. Bolts 27, two in number, proceed upwardly through and are threaded into the tapped apertures 26 and protrude thereabove as indicated. The lift arms 23 and 24 are initially positioned between lower flange 25 and skirt 21 into the upper hollow interior area 28 of the head. Thereupon, the lift arms, in having oversized apertures 29 and 30, are brought upwardly so that their ends proceed downwardly to engage in a pivotal manner the bolts 27. The head 19, of course, will be provided with the conventional ball fitting 31 which is secured in place by nut 32.

In an optional form of the invention the head 19 is provided with a slotted aperture 34 which receives the head of a depending, hook- or J-type bolt 35. The shank 35' of bolt 35 passes downwardly through friction bar aperture S' upon the friction bar 50. Nut 37 completes the attachment of the friction bar through the structure. It is seen that the upper surface 38 of the friction bar engages the lower surfaces 39 and 40 of lift arms 23.

Lift arms 23 and 24 engage at their respective rearward extremities certain clamping means 36. These clamping means serve to confine the disposition of the two lift arms 23 and 24 in a manner hereinafter to be described. The clamping means 36 each include a backing plate 37 provided with multiple apertures 38. Also included are L-configured side plates 29 provided with corresponding apertures 40. Bolt and nut attachments 41 secure the backing plates through the respective L-configured side plates in the manner indicated. It will be noted that each of the L-configured side plates include horizontal retainer flanges 42, the same including respective rectangular apertures 43. Hook-like or L-configured retainers 44 pass through the apertures 43 and are secured in place by respective retainers 45. The L-configured retainers 44 serve as respective loops for delimiting the transverse travel of respective lift arms 23 and 24 to substantially axial movement. This is to say, the lift arms may proceed inwardly and outwardly through the respective openings 46 of retainers 44 and side plates 39. However, the lift arms will be constrained from swinging either inwardly or outwardly when the trailer attachment moves about ball 31. The structure will be substantially identical for both lift arms 23 and 24, as indicated.

The structure operates as follows. At the outset it is to be noted that the construction is suited not only to a frame-hitch-type of attachment but also to other types of towing hitches including the axle-type hitch. See the inventor's U.S. Patent No. 3,021,154. The structure including drawbar 10, the end E thereof, clevis 11, and receptacle 12 forms a single, unitary drawbar-type of construction terminating in the receptacle 12 and pinned in place by means of pin 15' and retainer 14. The stub bar 15 will be welded in place between the two attachment brackets 18 after the latter are preliminarily bolted to head 19. The preliminarily jacked trailer frame T will next be provided with the trailer frame clamping means 36 in the manner indicated. Lift arms 23 and 24 are next installed in the manner indicated in FIGURE 4, wherein the ends thereof are inserted into the hollow interior 28 of the head and then the arms brought upwardly so that the ends thereof proceed downwardly over bolts 27. At this point the rearward extremities of the arms 23 and 24 are lifted upwardly over retainer flange 42 of each of the side plates 39, and L-configured retainers 44 are installed in position over the respective lift arms and downwardly through apertures 43. Then the retainer pins and cotters 45 are secured in place to complete lift arm securement.

At this point the forward end of the trailer will be relieved from its jack support so that the trailer will rest firmly on ball 31. The weight of the trailer tends to lift the rear portions of lift arms 23, upwardly so as to produce a friction effect between the skirt surface 22 and the upper surface of the respective lift arms 23 and 24. If it is desired, additional friction may be produced on the bars by means of inclusion of friction bar 50 and bracket 51, see FIGURE 5. In this regard the bracket 51 may be secured in place over head rib 52 by J-bolt 35; apertures R and S are provided for this purpose.

Let us assume at this point that the car and trailer are oriented in a straight manner, but that the car is now proceeding through a turn so that the trailer is angularly displaced from the direction of the car. See FIGURE 3. In negotiating a turn, as is evidenced in FIGURE 3, there will be a rubbing or friction effect between the upper surfaces of the lift arms 23 and 24 and the lower friction edge or surface 22 of skirt 21 of the head. It is this friction which will keep sidesway of the trailer with respect to the automobile to a minimum. Yet, and depending upon the adjustment of the frictional forces, this friction effect will not tend to bind the structure. For this purpose the additional friction bar 50, bolt and nut attachments 41, and the multiple aperture patterns of backing plates 37 and side plates 39 are provided. In short, the forces can be adjusted by this equipment such that the normal force of the trailer, projected at the points of frictional contact between the bars 23, 24, and head 19, may be such that there is no binding between the respective parts. Forces of friction may be adjusted and increased both by the friction bar 50 (through increasing tension of J-bolt 35) and also by variations in the engagements of bolt and nut attachments 41 with the side plate and backing plate structure.

Let use consider the situation wherein the vehicle and trailer are traveling along a straight highway or are negotiating a turn. At this time assume that there is a vehicle such as a large truck passing the vehicle and trailer combination in the opposite direction. In the absence of developed frictional forces, it will be noted that the alternate gusts of wind and the reduced pressure created by virtue of the Bernoulli theorem and Venturi effect (when one vehicle passes another and both are in close proximity) will effect a marked de-stabilizing of the structure. That is, the trailer will commence to swerve back and forth and the automobile itself will be alternately pushed away from and drawn toward the oncoming vehicle. Such changes in atmospheric condition will cause a marked swaying and vibration of the trailer structure relative to the vehicle which many times results in the turning over of the trailer. This is almost entirely avoided in the present invention since the friction developed between surface 22 of the head and the upper surfaces of the lift arms 23 and 24 provide a dampening action so as to hold sidesway to a negligible quantity.

It is thus seen that the present invention provides a new and useful drawbar-type of hitch which is ideally suited to existing road conditions, and which dampens the sidesway action of trailers in event of gusts of wind naturally or artificially produced. The frictional effect is insured and binding not chanced because the rearward passage of the lift arms 23, 24 through the clamping means structure insures a definite frictional travel of the forward portion of the lift arms relative to head 19. Hence, there is a direct frictional control of sidesway of the trailer frame T relative to the axis of the towing vehicle. It is further to be noted that the same structure serving as a lift fulcrum for head 19 (see friction surface 22) now additionally serves to impart the frictional forces necessary in deterring excessive movements of lift arms 23 and 24. This action is further assured through the restriction placed upon the movements of lift arms 23 and 24 by virtue of the clamping structure 36.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A trailer hitch including, in combination, elongate drawbar means; a head affixed to and rigidly disposed with respect to said elongate drawbar means and including a hitch mounting ball for receiving the mounting socket of a trailer frame; vertical pivot means affixed to said head; a pair of lift arm members mounted to said pivot means, being rotatable thereabout, and frictionally liftingly engaging said head; and means constructed and arranged for securement to the frame of a trailer to be towed, said securement means slideably and liftingly receiving said lift arm members and constraining the movement of said lift arm members to movements which are in correspondence with those of said frame when the latter is secured to said head mounting ball.

2. A trailer hitch including, in combination, elongate drawbar means; a head affixed to and rigidly disposed with respect to said elongate drawbar means and including a hitch mounting ball for receiving the mounting socket of a trailer frame; vertical pivot means affixed to said head; a pair of lift arm members mounted to said pivot means, being rotatable thereabout, and frictionally and liftingly engaging said head; and means constructed and arranged for securement to the frame of a trailer to be towed, said securement means slideably and liftingly receiving said lift arm members and constraining the movement of said lift arm members to movements which are in correspondence with those of said frame when the latter is secured, to said head mounting ball, and wherein said head includes a bar adjustably secured thereto and frictionally engaging said lift arm members upwardly at an area between said pivot means and said trailer frame.

References Cited
UNITED STATES PATENTS

| | | | |
|---|---|---|---|
| 2,918,308 | 12/1959 | Lowman | 280—406 |
| 3,021,154 | 2/1962 | Hedgepeth | 280—406 |
| 3,129,957 | 4/1964 | Bernard et al. | 280—406 |
| 3,206,224 | 9/1965 | Bock et al. | 280—406 |
| 3,297,340 | 1/1967 | Rendessy | 280—432 |

LEO FRIAGLIA, *Primary Examiner.*